Dec. 16, 1941.  L. S. HOBBS  2,266,319
ANTIFRICTION BEARING
Filed July 30, 1938   2 Sheets-Sheet 1
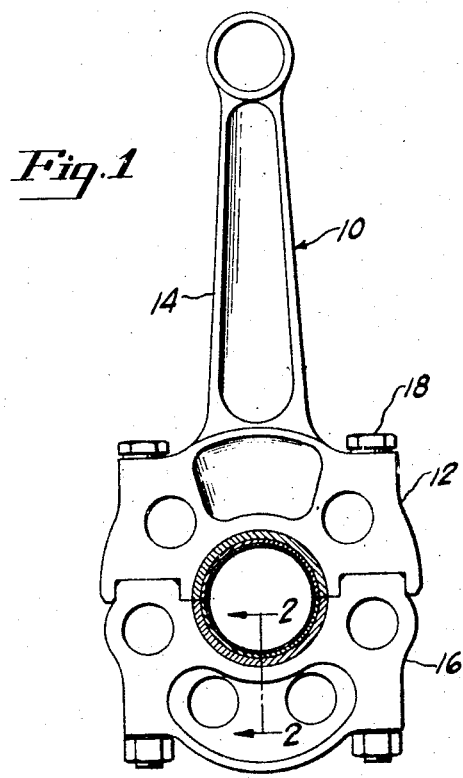
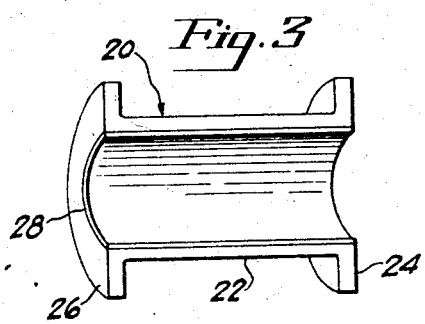
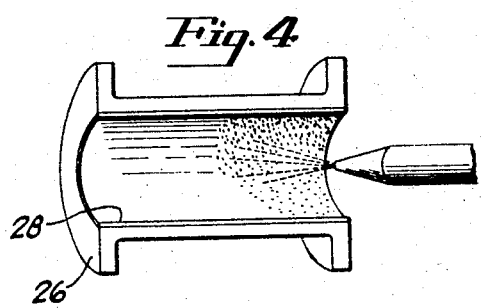
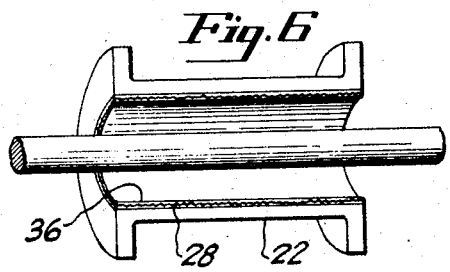
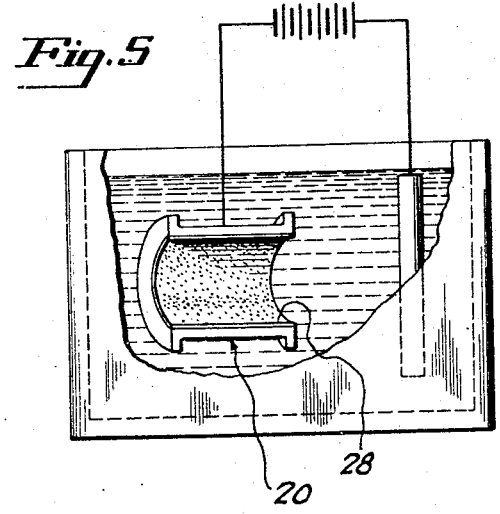
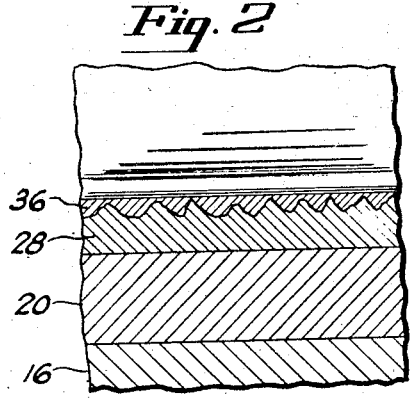
INVENTOR.
Leonard S. Hobbs
BY Harris G. Luther
ATTORNEY Dec. 16, 1941.   L. S. HOBBS   2,266,319
ANTIFRICTION BEARING
Filed July 30, 1938   2 Sheets-Sheet 2
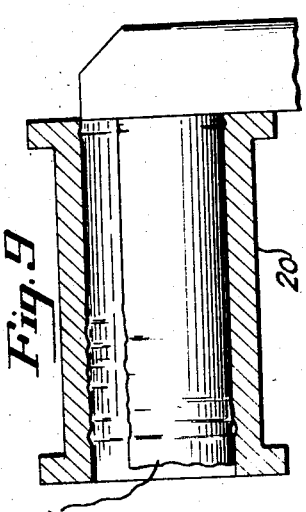
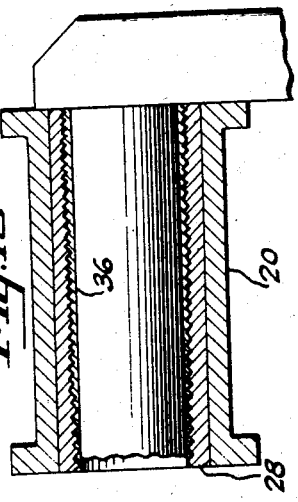
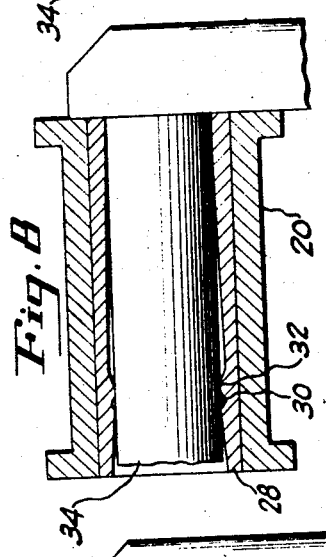
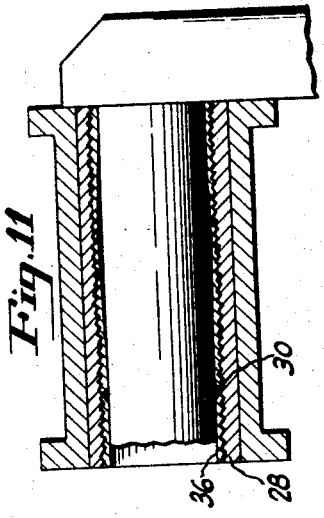
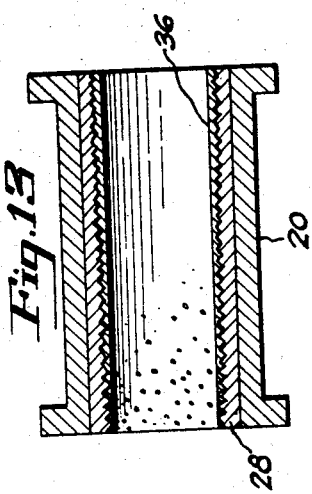
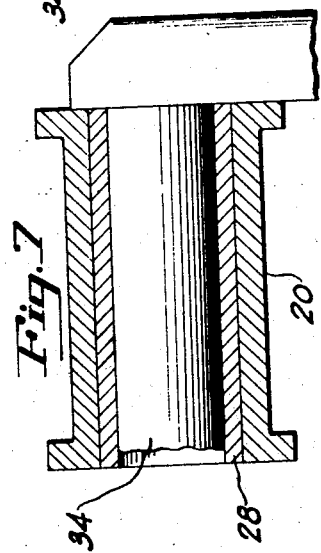
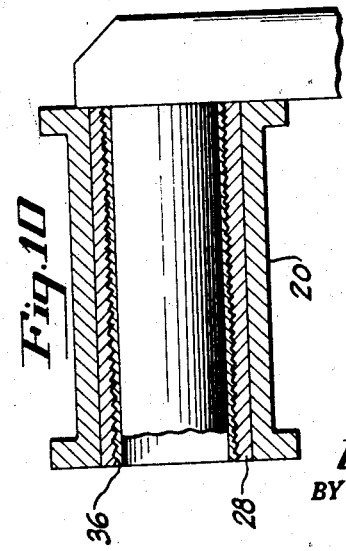
INVENTOR.
Leonard S. Hobbs
BY Harris G. Lucher
ATTORNEY Patented Dec. 16, 1941

2,266,319

UNITED STATES PATENT OFFICE 2,266,319

ANTIFRICTION BEARING

Leonard S. Hobbs, West Hartford, Conn., assignor to United Aircraft Corporation, East Hartford, Conn., a corporation of Delaware Application July 30, 1938, Serial No. 222,236

4 Claims. (Cl. 308—237)

This invention relates to an improved anti-friction bearing and an improved method of manufacturing the same and has for an object the provision of an improved bearing particularly adapted for use as a connecting rod or master rod bearing for an internal combustion engine.

Other objects and advantages will be more particularly pointed out hereinafter or will become apparent as the description proceeds.

In the accompanying drawings, in which like reference numerals are used to designate similar parts throughout, there is illustrated, by way of example, a suitable constructional form of bearing constructed according to the invention and various steps in the process of manufacturing the improved bearing. The drawings, however, are for the purpose of illustration only and are not to be taken as in any way limiting or restricting the scope of the invention as set forth in the appended claims.

In the drawings, Fig. 1 is an elevational view of an engine master rod showing a crankpin bearing, constructed according to the invention, applied thereto.

Fig. 2 is a sectional view of an enlarged scale on the line 2—2 on Fig. 1 showing in detail the construction of the improved bearing.

Figs. 3, 4, 5 and 6 illustrate various steps in the process of manufacturing the improved bearing starting with a bearing blank as shown in Fig. 3 and ending with the final smoothing or processing operation shown in Fig. 6.

Figs. 7, 8, 9, 10, 11, 12 and 13 illustrate various stages of operational deterioration of the improved bearing in comparison with similar stages of deterioration of a conventional bearing and are inserted for the purpose of more clearly demonstrating the new and useful functions of the improved bearing constructed according to the invention.

Referring to the drawings in detail and particularly to Figs. 1 and 2, the numeral 10 generally indicates an engine connecting rod, or master rod in the case of a radial engine, adapted to rotatably receive through its big end a crankpin, not illustrated. Fig. 1 shows a split type radial engine master rod having a portion of the big end 12 formed integrally with the arm 14 and, a separate portion, or bearing cap 16, secured to the portion 12 by suitable means, such as the bolt 18. While a split type master rod has been shown for illustrative purposes it is also conventional to use a solid master rod with a crankshaft made of separable portions which can be rigidly secured together after the crankpin has been inserted through the bearing aperture in the master rod.

In an internal combustion engine of the general character indicated it is the usual practice to form the crankpin of a relatively hard material such as steel and provide it with a smooth surface carefully finished to exact dimensions. The anti-friction element of the bearing is, in such a case, inserted in the pin receiving aperture in the master rod, or other connecting rod in the case of an in-line engine or similar machine, and is held by the master rod or connecting rod against rotation and lateral movements relative to the rod. Such a bearing is generally formed in two pieces for convenience in assembly, and each piece may comprise a relatively heavy semi-cylindrical backing member of a strong and durable material such as steel. Such a backing member or bearing retainer is particularly illustrated in Figs. 3, 4 and 6, as generally indicated by the numeral 20, and may take the form of a semi-cylindrical intermediate portion 22 provided with semi-circular integral end flanges 24 and 26. The interior of the backing member 20 is coated with a layer of suitable bearing material 28 which is generally a material softer than the material of which the crankpin is formed and is also a material having good bearing characteristics. This relatively thin layer 28 of bearing material is the critical part of the bearing from the standpoint of deterioration and failure. As long as the layer 28 can be maintained intact the bearing will continue to operate. The first requirement for continuous operation of the bearing is, of course, adequate lubrication, but it has been found that even with ample lubrication it is difficult to secure satisfactory bearing performance in modern high-powered engines.

While an engine crankpin bearing is illustrated and described for the purpose of disclosing the invention, the invention may be applied with equal facility to other types of anti-friction bearings.

For satisfactory bearing service it is apparent that, in addition to a complete film of lubricant between the relatively moving surfaces, at least one of said surfaces must have good oil wetting and anti-friction characteristics, a limited amount of resiliency and must be to a certain extent readily deformable in order to accommodate itself to minor inaccuracies of dimensions or alignment of the other surface. An ideal anti-friction bearing arrangement for interposition between two machine elements, one of which is received in or carried by and is relatively movable or rotatable with respect to the other, would be a smooth hard bearing surface on the movable or rotatable member and a layer of very soft metal of good anti-friction qualities carried by the other member and surrounding the bearing surface of the relatively movable or rotatable member. However, metals having the best anti-friction qualities are all so soft that they do not stand up well under heavy loads, such as the hammering action between a connecting rod and a crankpin. Such loads deform and spread a thick layer of such soft metal and, since most soft metals crack readily when deformed in the manner indicated, such a bearing soon goes to pieces in service. Also, if the layer of soft metal is thick enough to provide the necessary resiliency or deformability in the bearing it will be displaced and rolled up by the rotating member when under load. This causes a localization of bearing pressure which destroys the oil film and causes the bearing to seize and the rotatable member to shear or wipe the soft bearing material.

It is desirable, however, to have a surface of very soft metal in contact with the bearing surface of the rotatable element for the reason that the anti-friction qualities of various metals are more or less inversely proportional to the hardness of the respective metals.

Since it is necessary to maintain only a very thin layer of very soft metal in contact with the bearing surface of the rotating element, it is conceived that such a layer could be made of a minimum thickness just sufficient to accommodate the minor irregularities in the surface of the rotatable element and the tolerances in dimensions and alignment, which thickness would be of the order of one to six thousandths of an inch; and be carried upon a layer of somewhat harder material which would provide the necessary resiliency and still have sufficient strength to resist the forces imposed upon it by the bearing loads. The durability of the intermediate layer can be assured by carrying it upon a hard and rigid backing or retaining member. This construction provides a bearing having a contact layer of very soft readily flowable metal, an intermediate layer of metal of medium hardness and sufficient resiliency, and a rigid retaining or supporting layer of a hard metal. It is also highly desirable that the metal of the intermediate layer should be the best bearing metal obtainable having the proper degree of hardness and strength, so that, if the soft metal layer is entirely displaced locally there will still be a reasonably good, if not the best, bearing surface presented for contact with the surface of the rotatable element. It is also within the scope of the present invention to roughen the surface of the intermediate layer of metal before applying the layer of soft metal in order to provide at the bottom of the soft layer a thin interstrata layer including particles of both metals to improve the anti-friction qualities of the surface of the intermediate layer.

It is also conceived that a bearing may be constructed according to this invention comprising a number of strata or layers of metals of different degrees of hardness with corresponding anti-friction efficacy, arranged progressively in the order of hardness with the softest metal at the surface in contact with the surface of the rotatable or otherwise movable element and the hardest at the outer surface of the bearing, thus providing a bearing of gradually increasing hardness and strength away from the surface in contact with the rotatable element.

Among the various metals pure silver has been found to be satisfactory in a great many ways for the intermediate layer. Silver, however, in common with certain other metals of similar properties, has one characteristic which renders its use somewhat unsatisfactory for use as the layer in direct contact with the rotatable element, that is its relatively poor anti-friction and oil wetting qualities and its tendency to expand rather rapidly in response to increases in temperature. The disadvantageous effect of this relatively high coefficient of thermal expansion is that, if some disturbing factor occurs such, for instance, as a local increase in bearing pressure due to misalignment or other causes or the inclusion of a small particle of foreign material, such as is indicated at 30 in Fig. 8, the extra friction caused by this condition will heat up a small local area of the bearing metal and cause the same to expand. Such expansion brings a small area of the bearing lining into high pressure contact with the crankpin 34 and causes a still further increase in the friction between the crankpin and the bearing metal with a consequent increase in the temperature of the local area of the lining and a consequent further expansion of the local area and complete elimination of lubricant over such area. Once this process has been started it continues with increasing detrimental effect until the entire lining has been worn away, as is indicated in Fig. 9, and the bearing is no longer serviceable. As long, however, as the layer of silver or similar metal can be prevented from developing local hot spots with consequent high-pressure areas, such a bearing has been found to be entirely satisfactory. Since the action of the engine tends to hammer the bearing material between the crankpin and the backing member, which tends, of course, to decrease the thickness of the layer and increase its area, the layer of silver or similar bearing metal must be sufficiently thin to resist this action and must have a bond with the backing member that will retain the metal in place against spreading so that the thickness of the layer is not changed during operation of the engine. The thickness of this layer is controlled by the necessary resiliency of the bearing construction, but it has been found that ample resiliency is provided by a layer thin enough to remain substantially intact under operation.

In order to accomplish the above objectives a bearing element including a steel retainer 20 and a layer of bearing material 28 of the order of hardness including silver, is provided and machined so that the internal dimensions of the layer of bearing material are slightly too large for the crankpin upon which the bearing is to be fitted. The interior surface of the silver layer may then be roughened by some suitable means if desired, such as by sand blasting, as particularly illustrated in Fig. 4. A thin layer of some highly flowable, malleable metal of good oil wetting properties, such for example as lead, is plated onto the roughened surface of the layer of bearing metal, as is particularly illustrated in Fig. 5. The plated layer of lead, or similar metal may then be smoothed down and reduced to the proper thickness by a rolling operation, as is particularly illustrated in Fig. 6, or the thickness of the lead deposit may be accurately controlled so as to render the rolling operation unnecessary. When the bearing is thus completed it has the sectional form, fragmentarily illustrated in Fig. 2, in which the backing member, or retainer 20, is bonded to and carries the inner layer of cushioning metal 28 upon the inner surface of which is provided the layer of soft flowable metal 36. It will be noted that the flowable metal, or lead, 36 entirely covers the surface of the intermediate layer 28 and that none of the parts of the roughened surface of the layer 28 project entirely through the inner layer even though the layer 36 is extremely thin. The roughened surface of the layer 28 affords a good bond for the layer 36 and this layer is made so thin that the soft metal does not tend to spread or peel under the hammering action on the bearing when the engine is in operation.

The advantages of the improved bearing construction are particularly illustrated in Figs. 10, 11 and 12 when considered in comparison with the conditions illustrated in Figs. 7, 8 and 9. Fig. 10 somewhat schematically illustrates a completed bearing constructed according to this invention, comprising a retainer 20 to which is bonded a layer 28 of cushioning material, such as silver, and a thin layer 36 of readily flowable material, such as lead, applied to the roughened inner surface of the silver layer 28. As is particularly illustrated in Fig. 11, if there is a localized functional disturbance, such as might be caused by a small particle, 30, of foreign material getting into the bearing, it does not immediately produce an increased friction between the crankpin and the relatively hard intermediate bearing lining sufficient to cause a local hot spot in the lining and a growth or expansion of the silver or other constituent of the intermediate layer, but instead merely displaces a portion of the lead or other material of the soft inner layer 36. By displacing a small amount of the layer 36 the particle may imbed itself in the bearing to a position in which it does not cause a local disturbance in the bearing friction and, even though there is some local frictional increase during this imbedding process such increase will not set up the progressively destructive action described in connection with Figs. 8 and 9.

In the improved bearing, if the silver 28 tends to expand locally because of a localized temperature increase, some of the lead in the layer 36 will be wiped away from that area and this action will tend to relieve the pressure and stop the temperature increase. If the temperature increase and consequent expansion continues until the points of the roughened surface of the silver penetrates the lead lining, these points will be mashed down by the crankpin until the bearing at that location, is made large enough to relieve the pressure between the bearing surface and the crankpin and avoid further localized effects.

Fig. 13 illustrates an improved bearing constructed according to the invention after a period of operation during which localized loads or other operating conditions have caused the silver backing to "grow" and permanently retain its larger size so that the points of its roughened surface penetrate the lead layer and act to assist in supporting the load. It has been found that in order to produce a durable bearing the thickness of the soft inner layer must be controlled within quite narrow limits in order that there shall be sufficient metal in the bearing to perform the function described above and at the same time, that the layer shall be thin enough so that the bond between the inner layer and the surface of the intermediate layer will prevent the metal of the inner layer from spreading or peeling.

While a layer of lead and a layer of silver and a steel backing member or retainer have been mentioned as constituting a highly satisfactory bearing it is to be understood that the invention is not limited to these particular materials but that other metals having substantially the same or similar characteristics may be used without in any way exceeding the scope of the invention, and it is also possible, without in any way exceeding the scope of the invention, to apply the inner flowable layer to the bearing by other means than electroplating as has been particularly described hereinabove.

Having now described the invention so that others skilled in the art may clearly understand the same what it is desired to secure by Letters Patent is as follows:

1. In combination with relatively movable machine elements an anti-friction bearing comprising, one or more backing members of a material approximately as hard as the material of said machine elements carried by one of said elements, a layer of bearing metal containing at least fifty percent silver bonded onto the inner surface of each backing member, and a coating of lead on the exposed surface of said silver containing layer.

2. An anti-friction bearing comprising, a hollow cylindrical body of one or more parts in which the outer portion of said body comprises a relatively hard and rigid backing portion, and the inner portion comprises a thin layer of lead carried by an intermediate layer of silver.

3. An anti-friction bearing comprising, a rigid backing member, and a coating of bearing metals on said backing member containing silver and lead arranged in heterogeneous layers in which the respective metals predominate with the silver layer between the lead layer and the backing member, and in which the lead content of the coating does not exceed ten percent of the silver content.

4. In combination with relatively rotatable machine elements, an anti-friction bearing comprising, one or more backing members of a material approximately as hard as the material of said elements carried by one of said elements, a solid layer of bearing metal containing at least fifty percent silver bonded onto the inner surface of each backing member, and a coating of flowable metal of a thickness insufficient to materially affect the fit of the bearing by its presence or absence bonded onto the exposed surface of said intermediate layer.

LEONARD S. HOBBS.